Feb. 27, 1962    M. C. LOGAN    3,022,557
CABLE BUNDLING AND SUPPORTING STRAP
Filed June 24, 1958    2 Sheets-Sheet 1
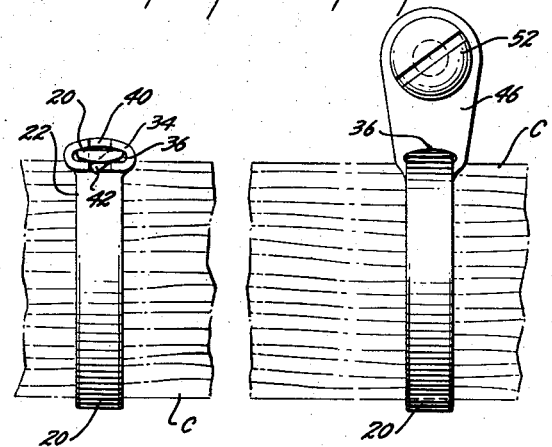
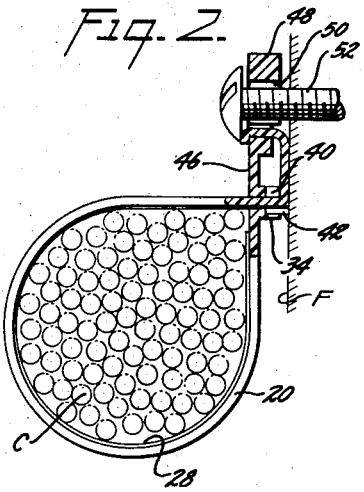
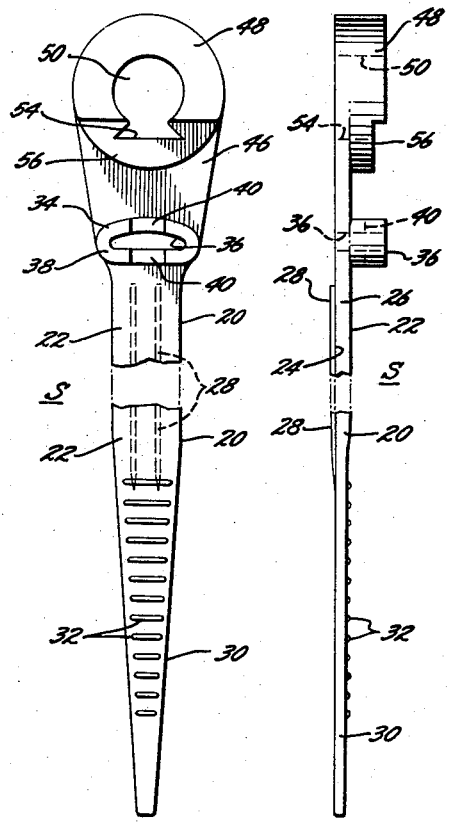
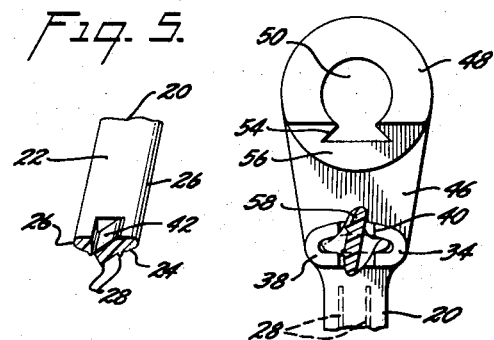
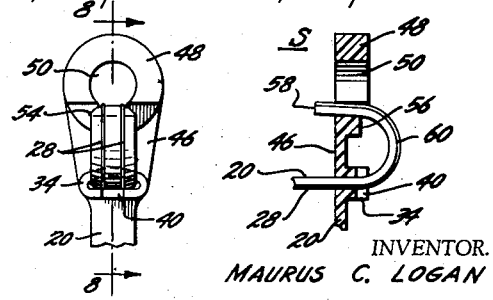
INVENTOR.
MAURUS C. LOGAN
BY
ATTORNEY.

Feb. 27, 1962 M. C. LOGAN 3,022,557
CABLE BUNDLING AND SUPPORTING STRAP
Filed June 24, 1958 2 Sheets-Sheet 2
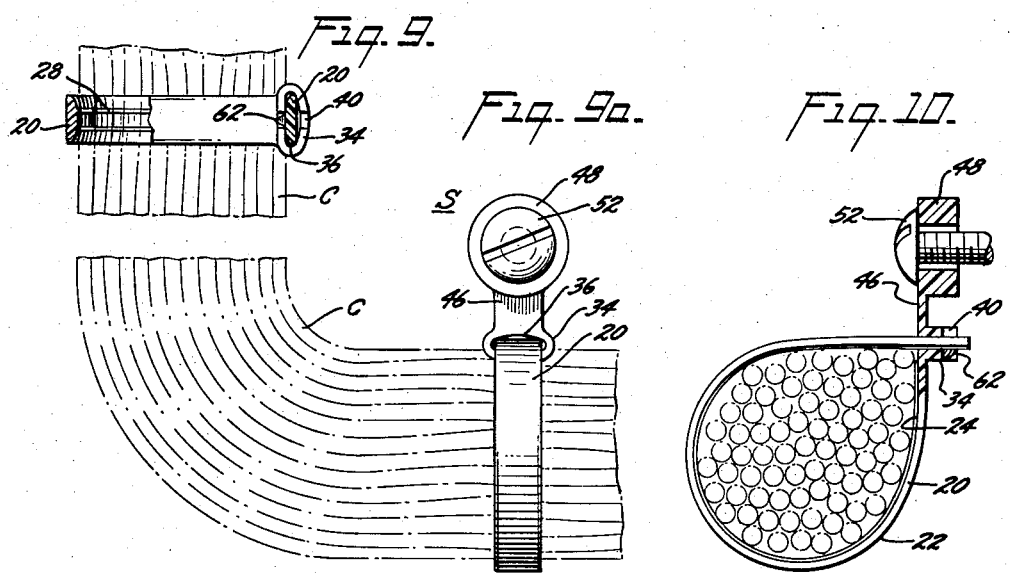
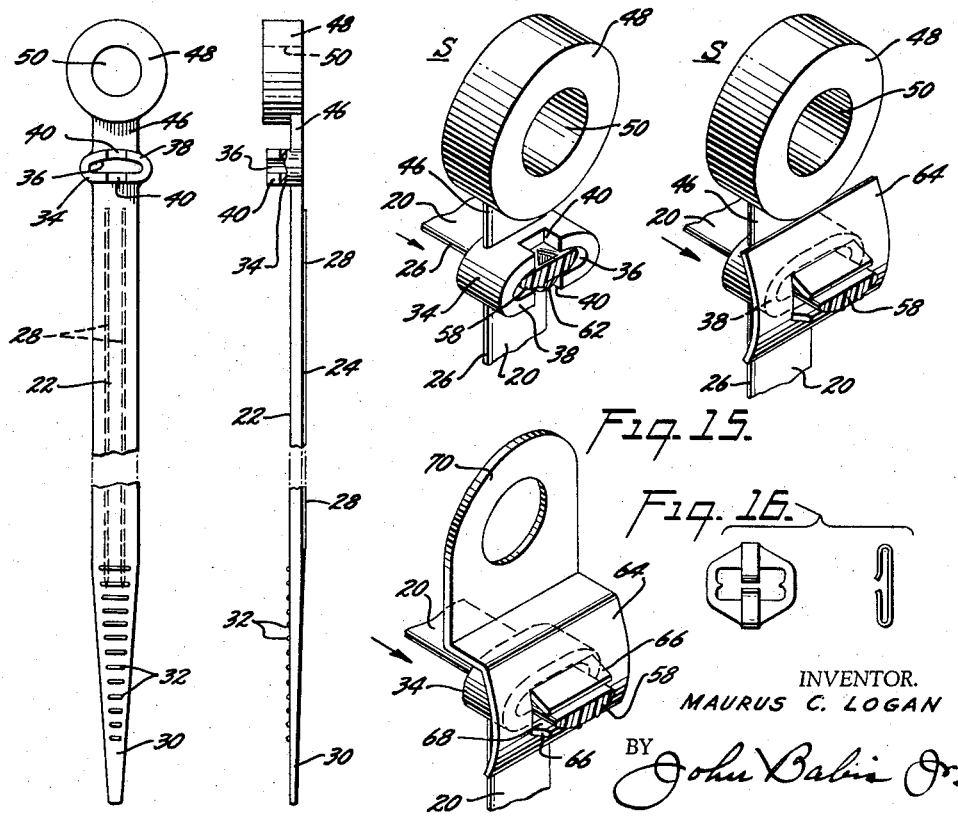
INVENTOR.
MAURUS C. LOGAN
BY John Babin Jr.
ATTORNEY.

United States Patent Office 3,022,557
Patented Feb. 27, 1962

3,022,557
CABLE BUNDLING AND SUPPORTING STRAP
Maurus C. Logan, Elizabeth, N.J., assignor to The
Thomas & Betts Co., Elizabeth, N.J., a corporation of
New Jersey
Filed June 24, 1958, Ser. No. 744,267
5 Claims. (Cl. 24—17)

The invention relates to bundling or tie straps and more particularly to tie straps which are inherently capable of being secured about bunched, parallel insulated conductors, for example, and for supporting the same from a fixed support.

More specifically, the invention relates to a flexible plastic tie strap which is particularly adapted for tying and supporting bunched, parallel insulated wire conductors in wired telecommunication systems and in electric circuits in large aircraft wherein such conductors are assembled and arranged in "harness" fashion for rapid mounting and connecting with various components thereof.

In the installation of electrical circuit harness in large aircraft, for example, as known heretofore, large numbers of insulated conductors were first laced together in bunched parallel relation by means of a length of cord or twine and such harness subsequently supported by means of insulation-lined metal rings or clamps at spaced intervals therealong, such metal rings or clamps being secured to a fixed support by means of suitable screws or the like, in known manner.

Such prior installation practice involved disadvantages by reason of the cost of initially lacing such conductors into circuit harness form and in subsequently securing such harness by means of insulation-lined metal rings or clamps, thus adding to the weight of aircraft, for example.

The present invention obviates the above-noted disadvantages by the provision of a plastic tie strap and support for such circuit harness, whereby the cost of assembling insulated wire conductors in circuit harness fashion and the final installation thereof is materially reduced and a reduction in the weight thereof obtained.

Heretofore, long lengths of insulated wire conductors were generally held together in parallel bunched relation by either tying or lacing them at spaced points therealong with suitable waxed twine or special nylon cord. The wax coating thereon makes the twine sticky and helps to keep it from untying, and incidently introduces a possible fire hazard. Such ties were individual pieces of twine, each separate from its neighbor and usually looped twice around the wire conductors and then secured in a suitable knot, which consumed a great deal of time. Moreover, on military work, anti-fungus liquid was applied to the severed ends of the twine to prevent absorption of moisture and start of fungus growth.

Insulated wire conductor harness is said to have been laced if a single length of suitable waxed twine has been wound around the wire conductors at spaced points therealong with a back-stitch. This is somewhat less time-consuming than tying, but not as flexible in application, and has the great disadvantage of causing an entire harness assembly to become unlaced if a single loop of the twine is severed.

An object of the invention is to provide a flexible plastic tie-strap for tying, lacing, treeing, wrapping, bundling, and stitching lengths of insulated wire conductors in bunched parallel relation at spaced points therealong, which obviates the above-noted disadvantages.

Another object of the invention is to provide a flexible, plastic tie-strap which is also adapted for strapping, clamping or otherwise securing insulated wire conductors in harness relation to a fixed supporting member or structure.

A further object of the invention is to provide a flexible plastic tie-strap as specified which obviates relative shifting of a bundle of insulated wire conductors when looped taut thereon.

Another object of the invention is to provide a flexible plastic tie-strap as specified whereby a plurality of lengths of insulated wire conductors may be quickly and effectively tied together in bunched, parallel, harness relation and subsequently secured to a fixed support or structure.

A further object of the invention is to provide a flexible plastic tie or bundling strap as specified which is adapted to be used repeatedly in the temporary tying together of insulated wire conductors in bunched parallel relation as on a mock-up panel, for example.

Another object of the invention is to provide a flexible plastic strap as specified which will not, in the use thereof with insulated wire conductors, cause the insulation covering of any one or more conductors to be pinched or damaged by a screw permanently securing the strap in conductor tying and supporting position to a fixed support.

A further object of the invention is to provide a flexible plastic strap as specified in which the tapered tail-end portion may be left intact with the intermediate body portion of the strap or severed therefrom after the strap has been looped upon itself and drawn through its transverse eyelet portion in frictionally clinched relation.

Another object of the invention is to provide a flexible plastic strap as specified which includes an auxiliary, unidirectional locking means on or adjacent its transverse eyelet portion for preventing relative reverse movement of the body portion of the strap in its eyelet portion after it has been looped therethrough in frictionally clinched relation.

A further object of the invention is to provide a flexible plastic strap as specified wherein an annular transverse mounting boss, formed on the head-end of the strap, may take the form of an open hook for suspending the strap, in conductor-tying position, from a fixed support by means of a screw-eye.

With the above and other objects in view, the invention resides in the novel construction, combination, and arrangement of parts, the novel features of which are set forth with particularity in the appended claims. The invention, both as to its organization and its method of operation, together with additional objects and advantages thereof, will best be understood from the following description of several specific embodiments thereof, when taken in connection with the accompanying drawings, in which:

FIG. 1 is a fragmentary elevational view showing the bundling strap in the form in which it is used for tying a plurality of insulated wire conductors in bunched parallel relation at spaced points therealong;

FIG. 1a is a similar view showing the bundling strap in the form in which it is used for securing a bundle of wire conductors, at intervening points therealong, to a fixed support;

FIG. 2 is a side view in elevation of the bundling strap of FIG. 1a, partly in section and showing an annular mounting boss in continuation of one end thereof;

FIG. 3 is a foreshortened front elevational view of the bundling strap prior to being formed into a loop tie as in FIG. 2;

FIG. 4 is a foreshortened edge view of the bundling strap as seen from the left in FIG. 3;

FIG. 5 is a fragmentary perspective view of the bundling strap showing one form of detent as struck out of the plane thereof for locking the strap in looped formation;

FIG. 6 is a fragmentary elevational view of the head-end portion of the bundling strap showing the free end of the strap twisted substantially normal to an intermediate apertured boss for locking the strap in looped formation, and with the excess strap portion severed from the twisted portion;

FIG. 7 is a fragmentary elevational view of the head-end portion of the bundling strap showing the tail-end portion thereof as looped through an apertured boss and reversed upon itself through a slot formed in an annular mounting boss forming the head-end of the strap;

FIG. 8 is a longitudinal section through FIG. 7, looking in the direction of the arrows;

FIGS. 9 through 12 are views respectively similar to FIGS. 1 through 8, showing a modified form of the bundling strap in which the annular mounting boss, forming the head-end of the strap, is not adapted for reversing the free tail-end portion of the strap therethrough as in FIGS. 1 to 8;

FIG. 13 is a fragmentary perspective view of the head-end portion of the bundling strap showing its free tail-end portion as looped through the intermediate apertured boss and locked against relative movement by means of a V-tooth struck out of the plane thereof in abutting relation with a slotted end face of the intermediate boss;

FIG. 14 is a similar fragmentary perspective view showing the free tail-end portion of the strap as looped through the intermediate apertured boss and locked against relative movement by a spring metal gripping plate; and FIG. 15 is a perspective view similar to FIG. 14, showing the metal gripping plate provided with an apertured extension for securing the bundling strap to a fixed support.

Referring to the drawings, and specifically to FIGS. 3, 4 and 5, a flexible bundling or tie-strap S, molded of nylon, for example, comprises an elongated body portion 20 having a flat side 22, a convex side 24, and rounded, parallel marginal edges 26, and presenting a somewhat oval configuration in cross-section.

The convex side 24 of the body portion 20 includes a pair of spaced, parallel, relatively narrow ribs 28, which extend throughout the major length thereof for a purpose presently to be described. One end of the body portion 20, comprising its tail-end portion 30, is tapered in its width and thickness and provided on its flat side 22 with small, spaced parallel projections 32 extending transversely thereof to provide a gripping surface thereon.

The opposite end of the body portion 20 of the strap S terminates in an elongated clinching eyelet 34 projecting laterally from the flat side 22 thereof and extending at right angles to the linear body portion 20, the eyelet 34 presenting a transverse aperture 36 therethrough having a convex side, a flat side and rounded ends of such size and radii as to correspond to the cross-sectional area of the body portion 20 of the strap S.

Further in accordance with the invention, the projecting end face 38 of the clinching eyelet 34 is provided with aligned rectangular slots 40 centrally across the aperture 36 thereof and extending lengthwise of the body portion 20 of the strap S, as best shown in FIG. 3.

The form of bundling or tie strap S thus far described in connection with FIGS. 3 and 4 is particularly adapted for tying a plurality of bunched insulated wire conductor lengths C, for example, firmly together at spaced points therealong, as schematically illustrated in FIG. 1.

In practice, the form of strap S thus far described is grasped at its tail-end 28, and its opposite eyelet end 34 passed about a bundle of wire conductors C or the like, with its ribbed convex side 24 in facing relation therewith, from its far side, then under the conductors C and forwardly upward to a position nearest to the operator, whereupon the eyelet end 34 is held with the left hand and the tail-end 28 intruded into and through the transverse aperture 36 therein until the tapered tail-end portion 30 of the body portion 20 has been forced therethrough.

With the stray S so looped about the bunched conductors C, the projecting tail-end portion 30 of the looped body portion 20 is gripped between the jaws of a special hand tool of the pliers type which is adapted to operate, in response to a closing movement thereof, to draw the body portion 20 of the strap S taut on the bunched conductors C; to partially cut a rectangular detent or tooth 42 out of the plane of the body portion 20, in a transverse direction, at a point close to the projecting end face 38 of the clinching eyelet 34; to deflect the free end of the tooth or detent 42 into the lower half of the rectangular slot 40, and substantially into abutment with the bottom thereof, as clearly shown in FIG. 1; and, in the final movement of the tool to closed position, to sever or cut off the excess length of the body portion 20 extending through the clinching eyelet 34 therefrom at a point outwardly adjacent the projecting end face 38 of the eyelet 34, as indicated in FIG. 2.

With further reference to FIG. 1, it is to be noted that the convex side 24 of the body portion 20 of the bundling or tie strap S and the convex portion of the aperture 36 in the clinching eyelet are so related to each other that, when the body portion 20 is looped upon itself and its tail-end portion 30 inserted into the aperture 36 in the eyelet 34, the convex side 24 of the body portion 20 will be inverted with respect to the convex portion of the aperture 36 and thus cause a tenacious frictional clinching action to take place between the peripheral surface defining the aperture 36 of the eyelet 34 and the sides and marginal surfaces of the body portion 20 of the strap S, by reason of the fact that the configuration and cross-sectional area of the body portion 20 of the strap S and the configuration and area of the aperture 36 in eyelet 34 are substantially equal. Thus, the body portion 20 of the strap S is held taut when so drawn about a bundle of wire conductors C or other objects, articles or parts for which the strap S has practical application.

It is to be noted that when the bundling or tie strap S is secured about a plurality of bunched parallel wire conductors C, as aforesaid, the convex side 24 of the strap S, including the spaced parallel ribs 28 extending lengthwise of its convex side 24, is disposed in binding engagement with the conductors C and thus held against relative lateral shifting movement thereon by the gripping action of the ribs 28 on the bunched insulated conductors C, while permitting relative rotation thereof to facilitate alignment of the apertured boss 48 with a screw-threaded opening in a fixed support.

Further in accordance with the invention, the bundling or tie strap S, as utilized for tying a plurality of insulated wire conductors C in bunched parallel relation, as exemplified in FIG. 1, is also provided with integral means adapted for securing the previously tied bundle of conductors C at intervening points therealong to a fixed support as indicated in FIGS. 1a and 2. Accordingly, as best shown in FIGS. 3 and 4, the bundling strap S includes an enlarged reinforcing section 46 in continuation thereof which extends beyond the clinching eyelet 34 and terminates in a circular boss 48 projecting laterally from the same side 22 of the body portion 20 thereof as the oval eyelet 34, the boss 48 being provided with a transverse aperture 50 for the reception of a suitable screw 52, or the like, for securing the bundling strap S to a fixed support, as exemplified in FIG. 2.

For a purpose presently to be described, a dovetail slot 54 is formed in the bottom of the aperture 50 in the boss 48, in a plane normal to the body portion 20 of the strap S, and the lower portion of the projecting face of the boss 48 undercut, as at 56, to provide a partial clearance space between the boss 48 and a fixed supporting surface when secured thereto.

In another arrangement, as in FIG. 6, the severed end 58 of looped body portion 20 of the bundling strap S, extended through the oval aperture 36 in the eyelet 34, is locked against possible relative reverse movement therein by twisting the severed end portion 58 with a force sufficient to utilize its elasticity to deflect the same substantially into alignment with and into the rectangular slots 40, formed in the adjacent face 38 of the eyelet 34, whereby the looped body portion 20 of the strap S will be so retained by virtue of the residual tensile loading obtained by the initial tightening of the strap S, about a plurality of bunched wire conductors C, sufficiently to cause at least some elongation of the looped body portion 20 thereof, and the mounting end portion of the strap S substantially flexed against the bunched conductors C. Thus, in the subsequent twisting of the free end portion of the strap S, extending through the eyelet portion 34, the inherent tendency of the tensioned and flexed portions of the strap to revert to normal condition operates to bring the aligned slots 40 in the adjacent face 38 of the eyelet portion 34 toward the twist in the extended free end portion of the strap S, and the twisted portion thereof toward the slot 40, whereby the looped body portion 20 of the strap S is locked against relative reverse movement in the clinching eyelet 34 and the surplus portion of the looped body portion 20 of the strap S, beyond its twisted portion 58, severed therefrom.

In another arrangement, as in FIGS. 7 and 8, the looped body portion 20 of the strap S is forced through the substantially oval aperture 36 in the eyelet portion 34, as hereinafter described, and its extended free end portion subsequently reversed upon itself and extended through the dovetail slot 54 provided therefor in the annular boss 48, the configuration and size of the dovetail slot 54 being such that the cross-sectional area and matching configuration of the body portion 20 of the strap S will fit snugly therein, when extended therethrough with its convex side 24 uppermost. Thus, when the looped strap S is secured to a fixed support (F, dotted lines, FIG. 2) by means of a suitable screw 52 extending through its mounting boss 48, the reversed loop 60, formed in the extended free end portion of the strap S, will be forced against the fixed support and substantially flattened into the clearance space afforded by the aligned slots 40, in the projecting end face of the eyelet portion 34, and the undercut clearance space 56 provided therefor in the projecting rear face of the mounting boss 48. In the mounting of the looped strap S on a fixed support by means of the screw 52, as aforesaid, the threads of the screw engage the portion of the ribbed side 24 of the strap disposed within the annular mounting boss 48, whereby the screw 52 is frictionally retained against counter-clockwise angular movement and the need for a lock washer thus obviated. After a mounting operation, as above described, the remaining free end portion of the strap S extending outwardly from the head-end of the screw 52 may be severed therefrom, as exemplified in FIG. 8, or the remaining free end portion of the strap S, including its tapered tail-end portion 30, left intact therewith for possible re-use thereof.

Further in accordance with the invention, the bundling or tie strap S illustrated in FIGS. 9 through 13 is basically the same as that described in connection with FIGS. 1 through 8, with the exception that the locking means for preventing possible reverse movement of the body portion 20 of the strap S relative to the clinching eyelet 34 comprises a detent in the form of a V-tooth 62 which is also partially cut out of the plane of the body portion 20, but lengthwise thereof with its pointed end deflected downwardly into the path of the aligned rectangular slots 40, provided therefor in the projecting face of the clinching eyelet 34, whereby the looped body portion 20 of the strap S is locked in a position of frictional adjustment against relative reverse movement. In this form of the invention, the annular boss 48, comprising the head-end of the bundling strap S, is not under-cut on either face thereof, nor provided with the dovetail slot 54, as in FIGS. 3 through 6, since the tail-end 30 of the looped body portion 20, extending through the aperture 36 in the clinching eyelet 34, is not folded or reversely bent upon itself as in FIGS. 7 and 8, and thus is severed therefrom.

Further in accordance with the invention and as shown in FIGS. 14 and 15, the body portion 20 of the bundling or tie strap S, after it has been looped upon itself and its free end portion forced through the aperture 36 in the clinching eyelet 34, is locked against relative reverse movement by an auxiliary means which may be employed in conjunction therewith to provide a secure anchorage for the extended tail-end portion or the severed end portion of the looped body portion 20 of the strap S, in addition to the frictional clinching thereof as provided by the eyelet 34. The auxiliary means aforesaid, comprises a small metal plate 64 having two opposed ears 66 struck centrally out of the plane thereof which extend obliquely toward one another transversely of the plane of the plate 64, and spaced from each other at their adjacent free ends to define a slot 68 therebetween adapted to receive the free end of the looped body portion 20 of the strap S freely therethrough in one direction, as indicated by the arrow. Thus, after the body portion 20 of the bundling strap S has been looped upon itself and its free end forced through the aperture 36 provided therefor in the clinching eyelet 34, the locking plate 64 is passed over the free extended tail-end portion 30 of the looped body portion 20 until it abuts the projecting face of the clinching eyelet 34, and the surplus body portion 20 of the strap S severed therefrom at a point adjacent thereto. From an inspection of FIG. 14 it will be clear that any tendency of a reverse movement of the severed end portion 20 of the strap S relative to the metal locking plate 64 will be resisted by the spaced edges of the ears 66 biting into the opposite sides 22 and 24 of the body portion 20 of the bundling strap S, and thus prevent relative reverse movement thereof.

A modified form of the metal clamping plate shown in FIG. 14 is illustrated in FIG. 15, wherein the annular boss 48 is omitted from the head-end of the bundling strap S, and the metal clamping plate 64 provided with an integral extension comprising a laterally offset upstanding apertured ear 70 for the reception of a suitable screw or the like therethrough, whereby the looped bundling strap S is adapted to be secured to a fixed support in the same manner as in FIGS. 1a, 2, 9a and 10.

While the metal member 64 for locking the looped body portion 20 of the strap S against reverse movement relative to the clinching eyelet 34, as shown in FIG. 14, abuts the end face of the clinching eyelet 34, it is also within the purview of the invention to provide a similar rectangular locking plate 64' of thin spring metal, as illustrated in FIG. 16, having a central opening 68' therein adapted to receive the projecting end portion of the eyelet 34 therethrough with a force fit to retain the same thereon, a pair of oppositely extending rectangular ears or fingers 66' being formed on opposite margins of the locking plate 64', and bent upon themselves at their base toward each other so as to occupy the aligned slots 40 in the eyelet 34. The square ends of the ears or fingers 66' are spaced sufficiently to permit relatively free passage of the body portion 20 of the strap therethrough, as when being drawn through the eyelet 34, in the direction of the arrows indicated in FIGS. 14 and 15, but to bite or dig into the opposite sides of the looped body portion 20 upon any tendency thereof toward relative reverse movement through the aperture 36 in the eyelet 34. In FIG. 6, axial displacement of a portion of the body portion of the strap is achieved by twisted portion 58 which interlocks with the slot 40; in FIG. 5 the tooth 42 is cut out of the plane of the body portion to thus define a displaced portion of the body portion of the strap for interlocking with the slot; in FIGS. 10 and 13 displacement of a portion of the body portion of the strap is attained as a V-tooth 62 partially cut out of the plane of the body portion 20. In each of the cases mentioned the body portion of the strap has a portion thereof displaced for interlocking with the slot 40.

While the invention has been illustrated and described with respect to several embodiments thereof, it is to be expressly understood that various changes and modifications may be made therein without departing from the inventive concept underlying the same. Therefore, the invention is not to be limited except as is necessitated by the prior art and the scope of the appended claims.

What I claim is:

1. A flexible strap for tying a plurality of wire conductors in bunched parallel relation, said strap including an apertured boss at one end thereof and a transverse eyelet portion adjacent thereto defining an opening in outline complementary to the cross-sectional configuration of said strap and adapted for looping the opposite end portion thereof through said eyelet portion in inverted frictional relation, the inner periphery of said boss provided with a dovetail slot transversely of said strap and in adjacent parallelism with said eyelet portion adapted for receiving the extended free end portion of said strap therethrough in final reversed relation relative to that portion thereof extending through said eyelet portion, said apertured boss having one face thereof undercut radially of said dovetail slot to provide clearance for the final reversed end portion of staid strap whereby when said strap is secured to a fixed support by means of a screw through said apertured boss, the extended free end of said strap will be clamped between said boss and fixed support.

2. A bundling device comprising a strap having an elongated, flexible body portion, a mounting boss having an aperture therein constituting one end of said body portion, an eyelet portion adjacent said apertured boss, said eyelet portion having a transverse aperture therethrough, said body portion of the strap and transverse apertured portion of the eyelet being so proportioned that the body portion of the strap may be passed through the eyelet portion, a portion of said boss being undercut to provide a clearance between the boss and a supporting surface to which it may be secured, there being a slot opening into the aperture of said boss and disposed angularly relative to the longitudinal axis of the strap, whereby the body portion of the strap, passed through the eyelet aperture, may be passed through said slot with a portion thereof between said eyelet portion and said slot occupying said clearance space to lock said strap against displacement.

3. A flexible strap for tieing a plurality of wire conductors in bunched parallel relation, said strap having an elongated, flexible body portion defining an elongated axial plane, an eyelet socket portion formed thereon having an aperture extending transversely through the body portion and eyelet socket portion, said eyelet socket portion being provided with a slotted portion communicating with the aperture extending transversely through the eyelet socket portion said slotted portion being disposed substantially parallel to the longitudinal axis of the body portion of the strap and inwardly of the eyelet socket portion and bisecting the eyelet socket portion, whereby the body portion of the strap may be passed through the eyelet aperture, and the free end portion of the strap body portion displaced out of the plane thereof about its axis and registered with said slotted portion to thereby latch the body portion of the strap to the eyelet socket portion against accidental withdrawal therefrom.

4. In a bundling device as set forth in claim 3, said eyelet portion being so formed at one end of the body portion of the strap to extend out of the plane of the body portion of the strap.

5. A flexible strap for tieing a plurality of wire conductors in bunched parallel relation, said strap having an elongated, flexible body portion defining an elongated axial plane, an eyelet socket portion formed thereon having an aperture extending through the body portion and eyelet socket portion, said aperture being disposed in a given plane, said eyelet socket portion being provided with a slotted portion communicating with said aperture, said slotted portion being disposed in a plane substantially angularly of the plane of said aperture and inwardly of the eyelet socket portion and bisecting the eyelet socket portion, whereby the body portion of the strap may be passed through the eyelet aperture, and the free end portion of the strap body portion displaced out of the plane thereof about its axis, and registered with the slotted portion to thereby latch the body portion of the strap to the eyelet socket portion against accidental withdrawal therefrom.

References Cited in the file of this patent

UNITED STATES PATENTS

| | | |
|---|---|---|
| 876,402 | Schacht | Jan. 14, 1908 |
| 1,804,725 | Walker | May 12, 1931 |
| 1,945,932 | Caley | Feb. 6, 1934 |
| 2,361,506 | Smith | Oct. 31, 1944 |
| 2,400,801 | Albin | May 21, 1946 |
| 2,632,217 | Flora | Mar. 21, 1953 |
| 2,759,390 | Edwards | Aug. 21, 1956 |
| 2,915,268 | Wrobel | Dec. 1, 1959 |

FOREIGN PATENTS

| | | |
|---|---|---|
| 209,500 | Australia | Aug. 5, 1957 |
| 1,126,581 | France | July 30, 1956 |

UNITED STATES PATENT OFFICE
CERTIFICATE OF CORRECTION

Patent No. 3,022,557                                    February 27, 1962

Maurus C. Logan

It is hereby certified that error appears in the above numbered patent requiring correction and that the said Letters Patent should read as corrected below.

Column 3, line 31, strike out "and"; line 35, for "support." read -- support; and --; same column 3, between lines 35 and 36, insert the following:
        FIG. 16 is a modification of the locking
    plate 64 shown in FIG. 14.

Signed and sealed this 10th day of July 1962.

(SEAL)
Attest:

ERNEST W. SWIDER                                DAVID L. LADD
Attesting Officer                                   Commissioner of Patents